US006192762B1

(12) United States Patent
Sheng

(10) Patent No.: US 6,192,762 B1
(45) Date of Patent: Feb. 27, 2001

(54) PRESSURE GAUGE PROTECTION ARRANGEMENT OF AN AIR CYLINDER

(76) Inventor: Chih-Sheng Sheng, No. 100, Tzu Chiang W. Road, Kweishan Hsiang, Tao-Yuan Hsien (TW)

( * ) Notice: Subject to any disclaimer, the term of this patent is extended or adjusted under 35 U.S.C. 154(b) by 0 days.

(21) Appl. No.: 09/225,330

(22) Filed: Jan. 5, 1999

(51) Int. Cl.[7] .................................................. G01L 7/00

(52) U.S. Cl. .................................................. 73/756

(58) Field of Search .............................. 73/706, 715, 720, 73/721, 726, 727, 756

(56) References Cited

U.S. PATENT DOCUMENTS 5,524,492 * 6/1996 Frick et al. ............................ 73/706
5,809,974 * 9/1998 Osakabe ................................ 73/756
5,834,652 * 11/1998 Koshimizu ............................ 73/756

* cited by examiner

*Primary Examiner*—William Oen
(74) *Attorney, Agent, or Firm*—Rosenberg, Klein & Lee

(57) ABSTRACT

A pressure gauge protection arrangement installed in the body of an air cylinder, including a base having an inlet pipe, an outlet pipe, and a plurality of mounting holes, at least one pressure gauge respectively connected lo the base by a respective coupling tube for air pressure detection a top cover fixedly mounted on the base at a front side, the top cover having a plurality of mounting holes respectively fastened to the mounting holes at the base by respective screw bolts, and a part integrated with a rigid shield covered oil the at least one pressure gauge to protect the at least one pressure gauge against impact, the shield having at least one opening respectively disposed corresponding to the face of each of the at least one pressure gauge, a transparent cover plate respectively mounted in the at least one opening, and a back side covered with a back cover plate to protect the back side of each of the at least one pressure gauge against impact.

1 Claim, 15 Drawing Sheets

PRESSURE GAUGE PROTECTION ARRANGEMENT OF AN AIR CYLINDER

BACKGROUND OF THE INVENTION

The present invention relates to air cylinders, and more specifically to a pressure gauge protection arrangement for an air cylinder.

A regular air cylinder 8 which holds a compressed gas for example oxygen, acetylene, ammonia, argon, etc., as shown in FIG. 12, is provided with a pressure regulator 9 for regulating the pressure of output gas for a safety application. The pressure regulator 9, as shown in FIGS. 13 and 14, comprises a base 91 having an inlet pipe 911 and an outlet pipe 912 at two opposite sides. Two pressure gauges 92 are mounted on the base 91 at the top side for detecting the pressure of input gas and the pressure of output gas respectively. A top cover 93 is covered on the base 91, defining a pressure chamber. The top cover 93 has a tubular projection 931, and a rotary knob 94 mounted on the tubular projection 931 for regulating the pressure of output gas. This arrangement has drawbacks. The pressure gauges 92 use front and back shells 921 and 922 to hold respective pressure sensors 923, dials 924, indexes 925 and glass plates 926 in place, and the shells 921 and 922 are fixedly fastened to respective coupling tubes 928 by screws 927, which coupling tubes 928 are respectively connected to the base 91. Because the shells 921 and 922 are made of a thin metal sheet by stamping, they tend to be deformed by an impact (see FIG. 15), causing the pressure sensors 923, dials 924 and indexes 925 of the pressure gauges 92 to be damaged. Because the pressure sensors 923 are sensitive, they tend to be damaged by an impact. In order to eliminate this problem, a metal shield may be installed and covered on the pressure gauges 92 for protection. However, when the metal shield is impacted, a stress is produced at the connecting area between the base 91 and the coupling tubes 928, causing the coupling tubes 928 to be deformed or broken.

SUMMARY OF THE INVENTION

The present invention has been accomplished under the circumstances in view. It is one object of the present invention to provide a pressure gauge protection arrangement for an air cylinder which effectively protects the pressure gauges of the air cylinder against impact. It is another object of the present invention to provide a pressure gauge protection arrangement for an air cylinder which is easy to install. It is still another object of the present invention to provide a pressure gauge protection arrangement for an air cylinder which causes a sense of beauty, and increases the value of the air cylinder. According to one embodiment of the present invention, the pressure gauge protection arrangement comprises a base integral with the body of an air cylinder, the base having an inlet pipe, an outlet pipe, and a plurality of mounting holes, at least one pressure gauge respectively connected to the base by a respective coupling tube for air pressure detection, a top cover fixedly mounted on the base at a front side, the top cover having a plurality of mounting holes respectively fastened to the mounting holes at the base by respective screw bolts, and a part integrated with a rigid shield covered on the at least one pressure gauge to protect the at least one pressure gauge against impact, the shield having at least one opening respectively disposed corresponding to the face of each of the at least one pressure gauge, a transparent cover plate respectively mounted in the at least one opening, and a back side covered with a back cover plate to protect the back side of each of the at least one pressure gauge against impact. Because the back cover plate is disposed in flush with the periphery of the base and the top cover after its installation and because the shield is integral with the top cover, the arrangement has a nice looking.

DETAILED DESCRIPTION OF THE PREFERRED EMBODIMENT

Figure 1:
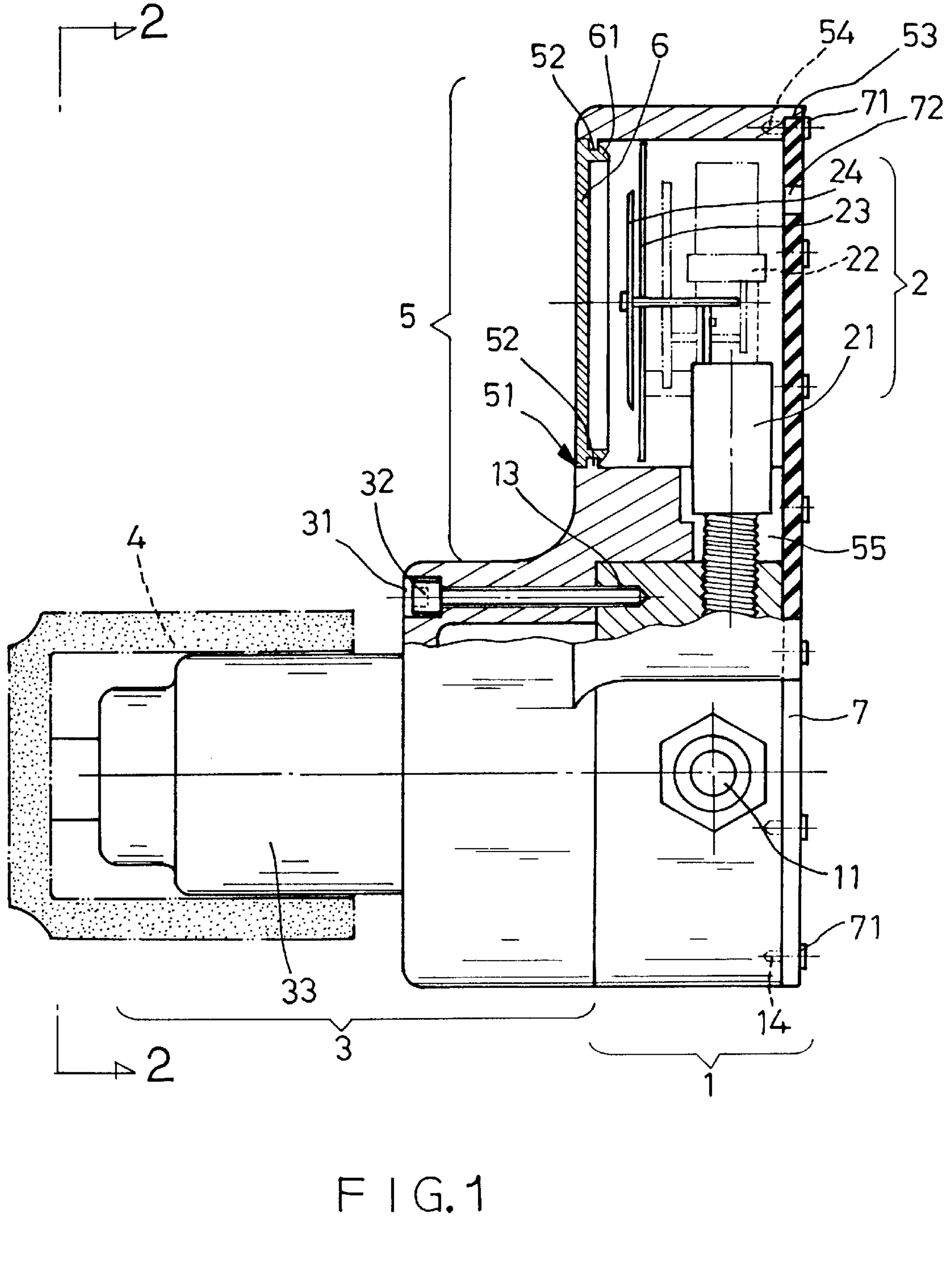
FIG. 1 is a sectional assembly view of a pressure gauge protection arrangement according to the present invention.
Figure 2:
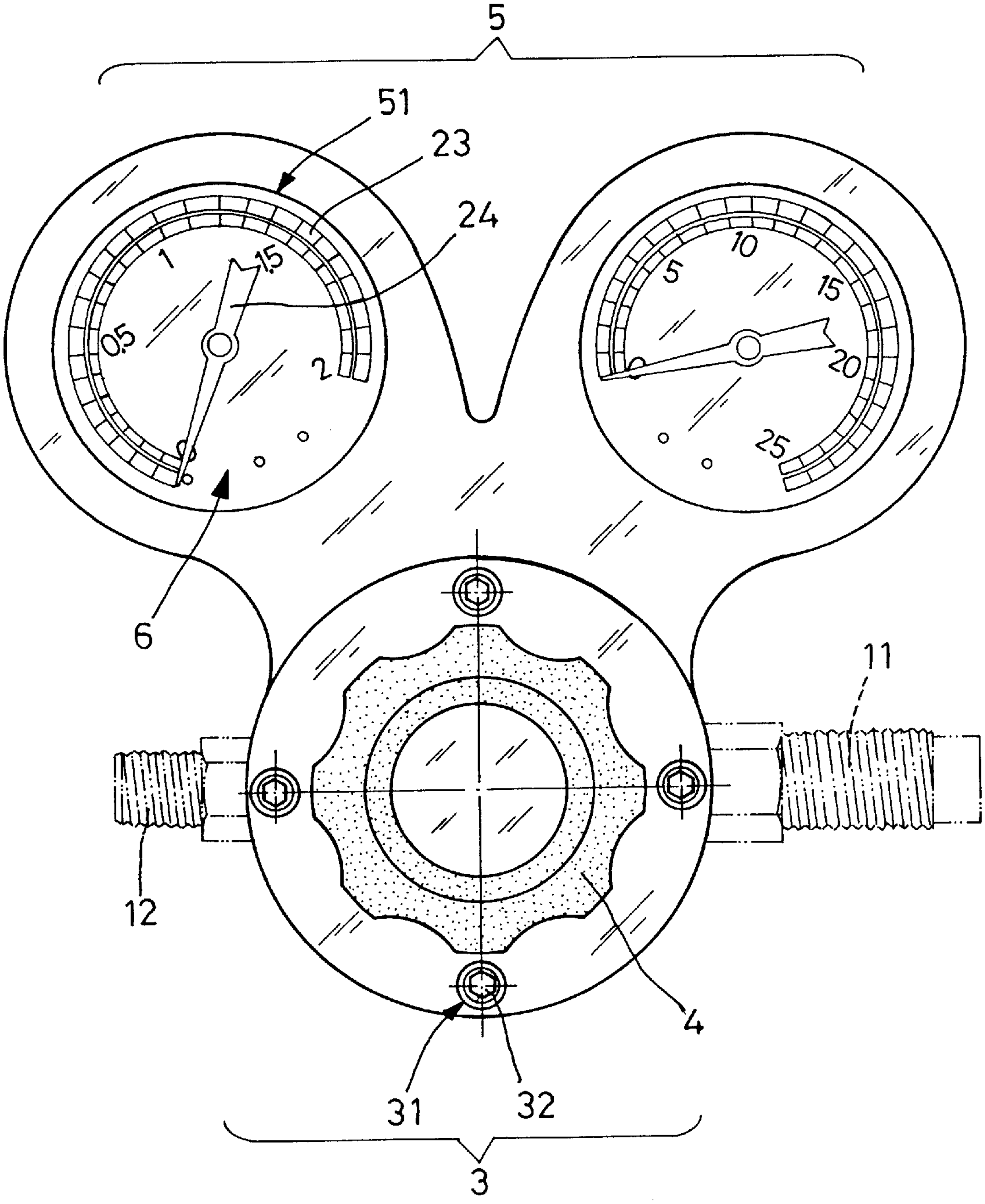
FIG. 2 is sectional view taken along line 2—2 of FIG. 1.

Referring to FIGS. 1 and 2, the present invention comprises a base 1 (which is integral with the cylinder body of an air cylinder), at least one for example two pressure gauges 2, and a top cover 3. The base 1 comprises an inlet pipe 11, an outlet pipe 12, and the necessary gas passage loop and control valve means on the inside (not shown). The necessary gas passage loop and control valve means are of the known art and not within the scope of the present invention, therefore they are not described herein in detail. The pressure gauges 2 each have a coupling tube 21 respectively fastened to the base 1 to receive the pressure of gas from the air cylinder, a pressure sensor 22 provided at the coupling tube 21, a dial 23, and an index 24 mounted in the center hole at the dial 23 and turned by the pressure sensor 22 relative to the dial 23 to indicate the value of the pressure of gas detected by the pressure sensor 22. The top cover 3 is fixedly mounted on the base 1 at the front side, defining with the base 1 a pressure chamber.

The base 1 comprises a plurality of screw holes 13 at its front side, and a plurality of mounting holes 14 at its back side around the border. The top cover 3 comprises a plurality of mounting holes 31 respectively fastened to the screw holes 13 at the base 1 by respective screw bolts 32. A shield 5 is integral with the top cover 3, and covered over the pressure gauges 2. The shield 5 comprises two circular openings 51 respectively disposed corresponding to the dials 23 of the pressure gauges 2, and two glass plates 6 respectively mounted in the circular openings 51. A back cover plate 7 is closed on the back side of the shield 5, and fixedly secured thereto by for example screw means. Because pressure gauges 2 mounted within the shield 5, it is well protected by the shield 5, the back cover plate 7, the glass plates 6 and the base 1.

Figure 3:
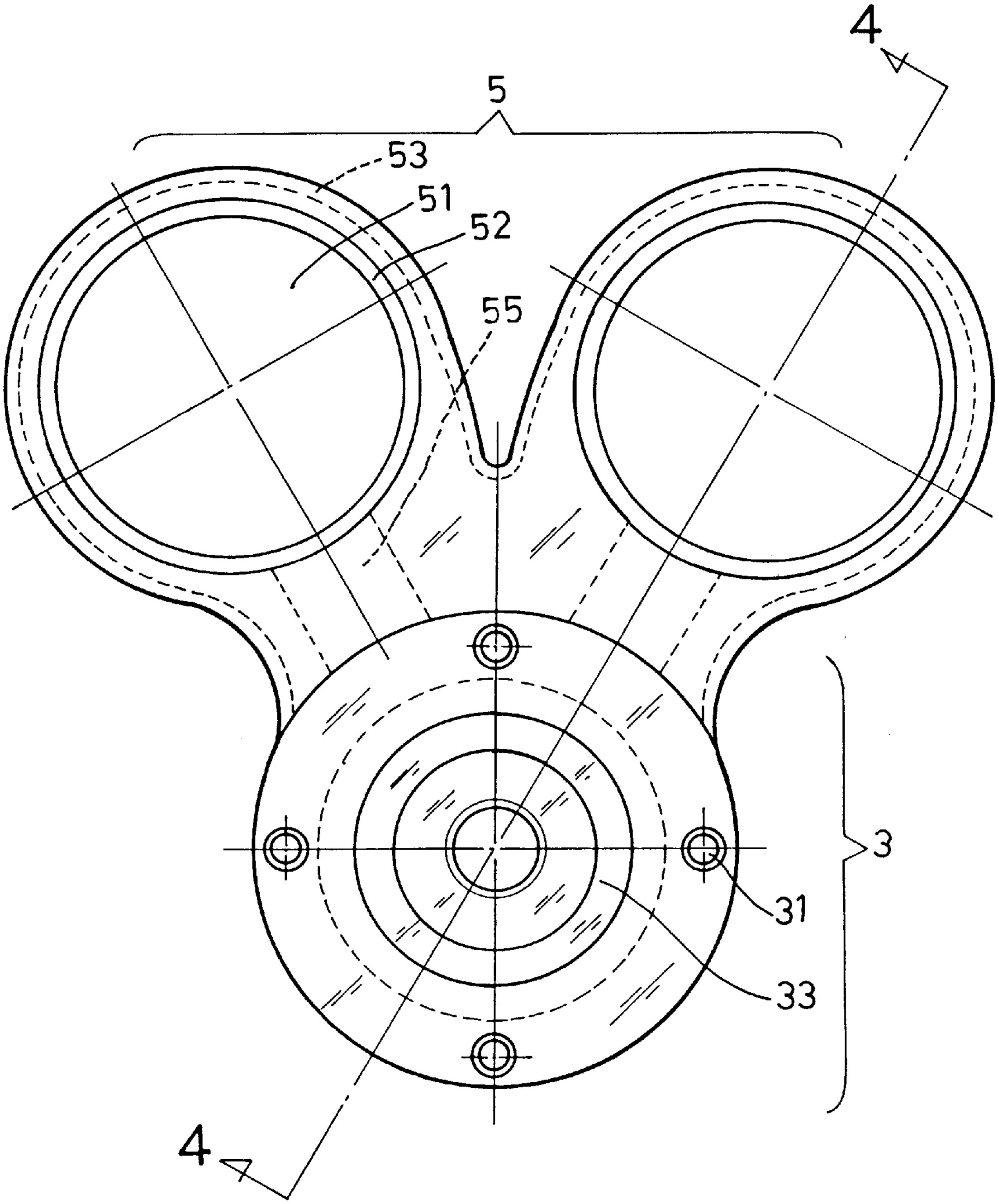
FIG. 3 is a front view of the top cover of the pressure gauge protection arrangement shown in FIG. 1.
Figure 4:
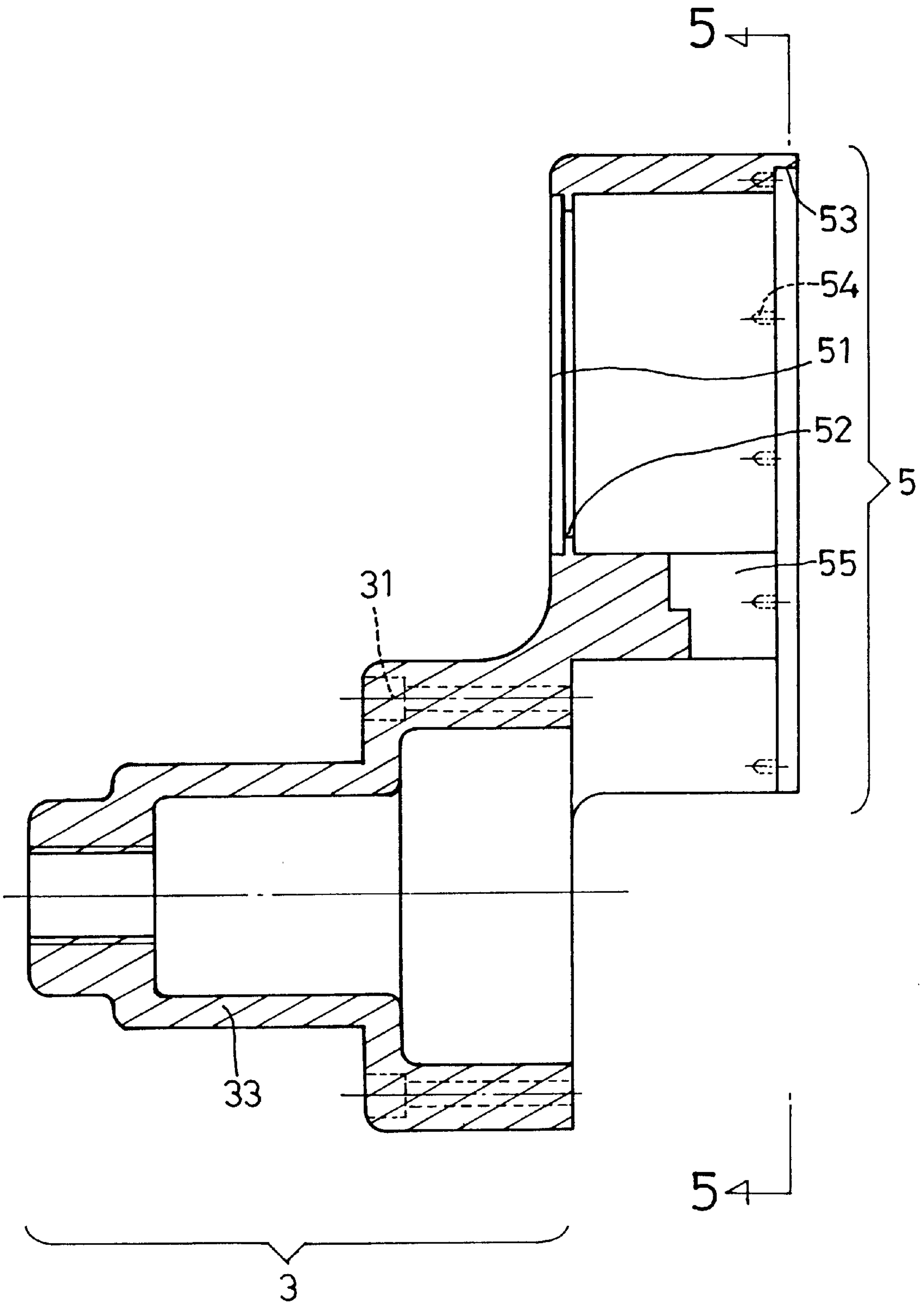
FIG. 4 is a sectional view taken along line 4—4 of FIG. 3, showing the internal arrangement of the top cover.
Figure 5:
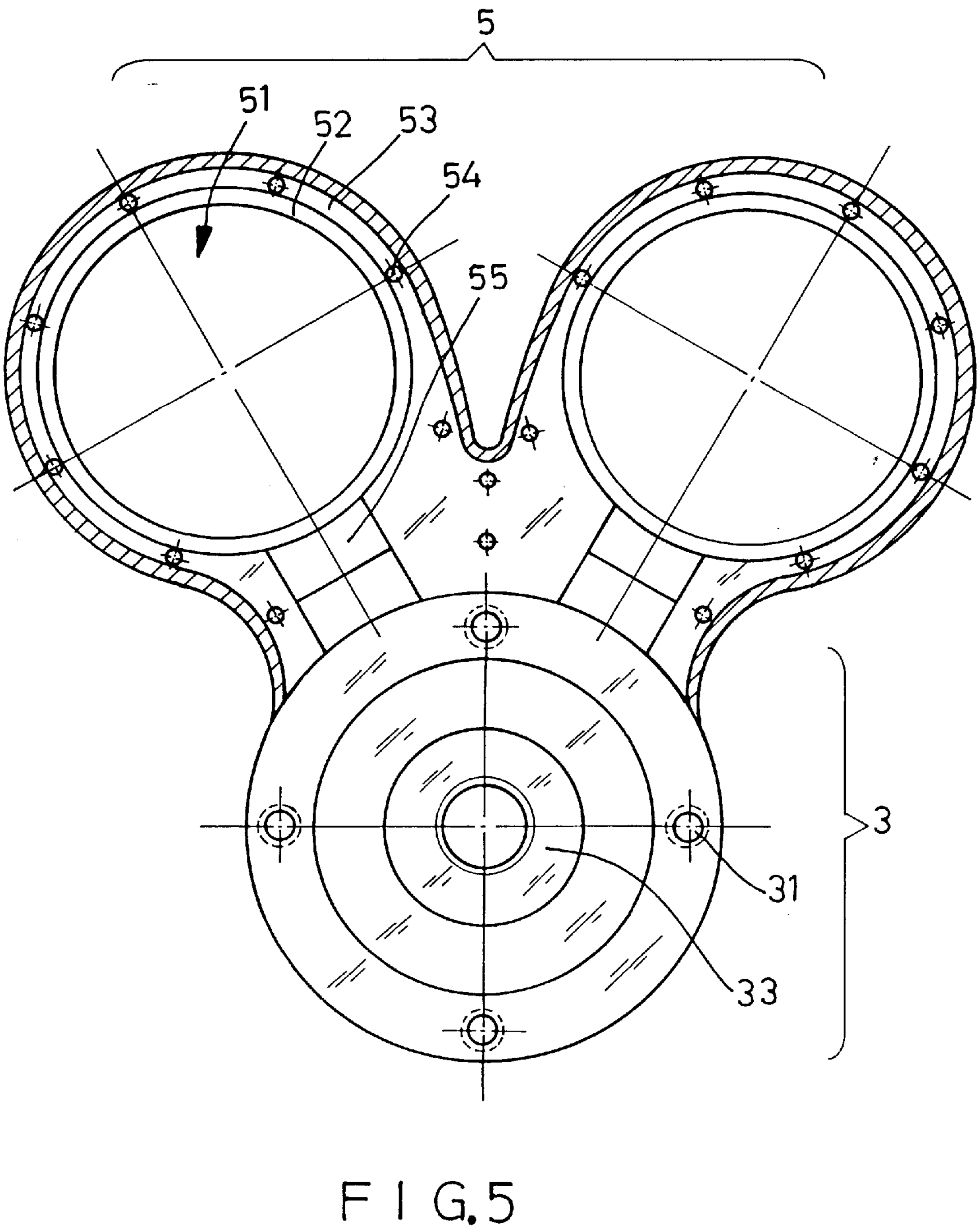
FIG. 5 is a sectional view taken along line 5—5 of FIG. 4, showing the structure of the back side of the top cover.

Referring to FIGS. 3, 4 and 5, the two pressure gauges 2 are provided to detect the gas pressure inside the air cylinder 8 and the gas pressure outputted from the outlet pipe 12. The shield 5 has a curved peripheral wall fitting the contour of the pressure gauges 2. Because the shield 5 is made of rigid metal in integrity with the top cover 3, it is strong enough to well protect the pressure gauges 3 against impact. The shield 5 comprises a coupling flange 52 around each circular opening 51, and a recessed locating portion 53 at its back side, a plurality of mounting holes 54 at the recessed locating portion 53, and two recessed receiving portions 55, which receive the coupling tubes 21 of the pressure gauges 2 respectively. The glass plates 6 each have a coupling flange 61 raised around the periphery, which are respectively forced into engagement with the coupling flanges 52 at the circular openings 51. The back cover plate 7 is fitted into the recessed locating portion 53, and fixedly fastened to thc mounting holes 54 by fastening elements 71. The fastening elements 71 can be screws or rivets.

Figure 6:
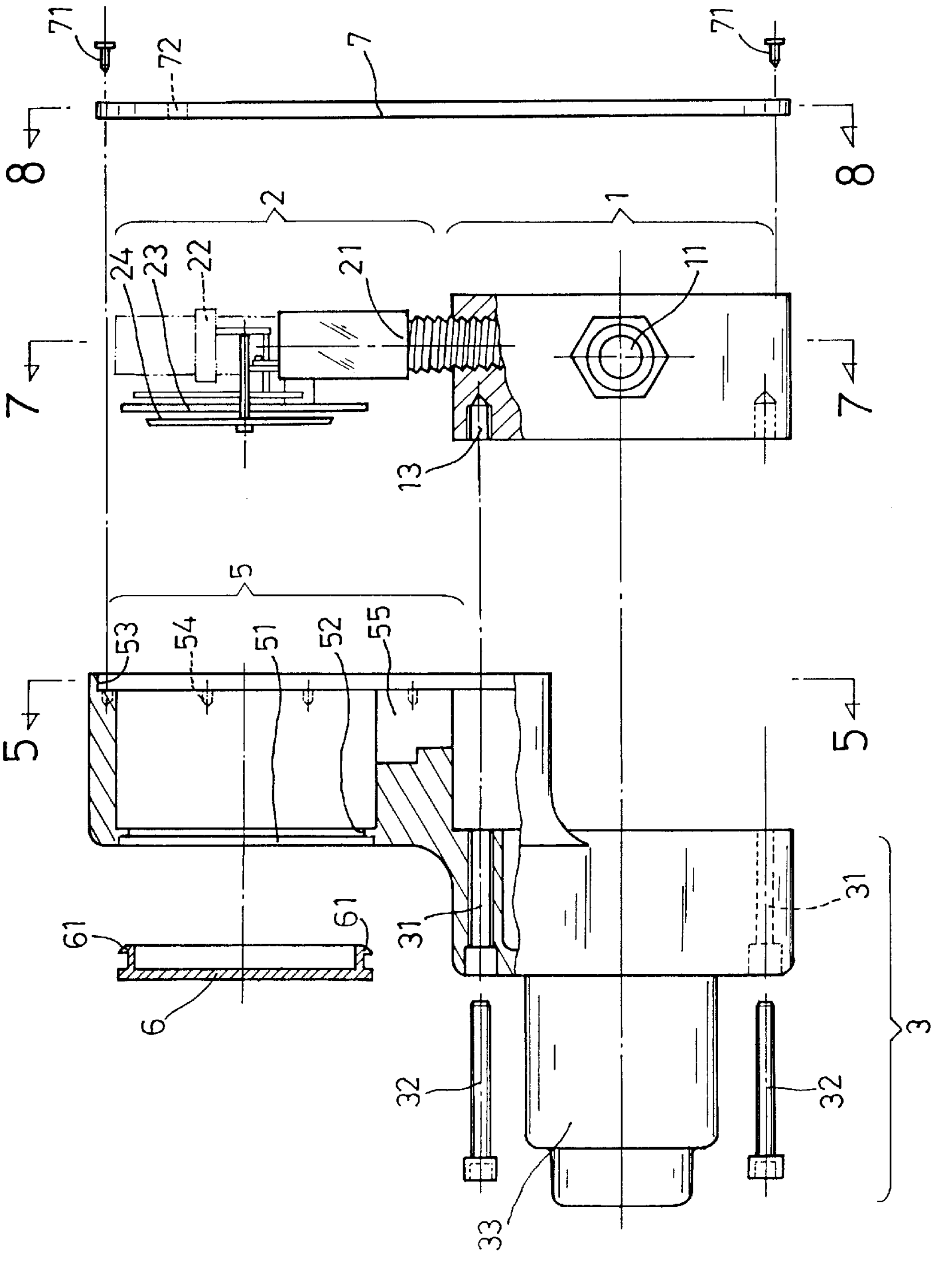
FIG. 6 is an exploded view of the pressure gauge protection arrangement shown in FIG. 1.

Referring to FIG. 6 and FIGS. from 1 through 5 again, the screw bolts 32 are respectively inserted through the mounting holes 31 at the top cover 3 and threaded into the respective screw holes 13 at the base 1 to fix the top cover 3 to the base 1. After installation of the top cover 3, the shield 5 is automatically set into position and covered on the pressure gauges 2, then the glass plates 6 are respectively mounted in the circular openings 51 at the shield 5, and then the back cover plate 7 is fixedly fastened to the shield 5 and the base 1 at the back side.

Figure 7:
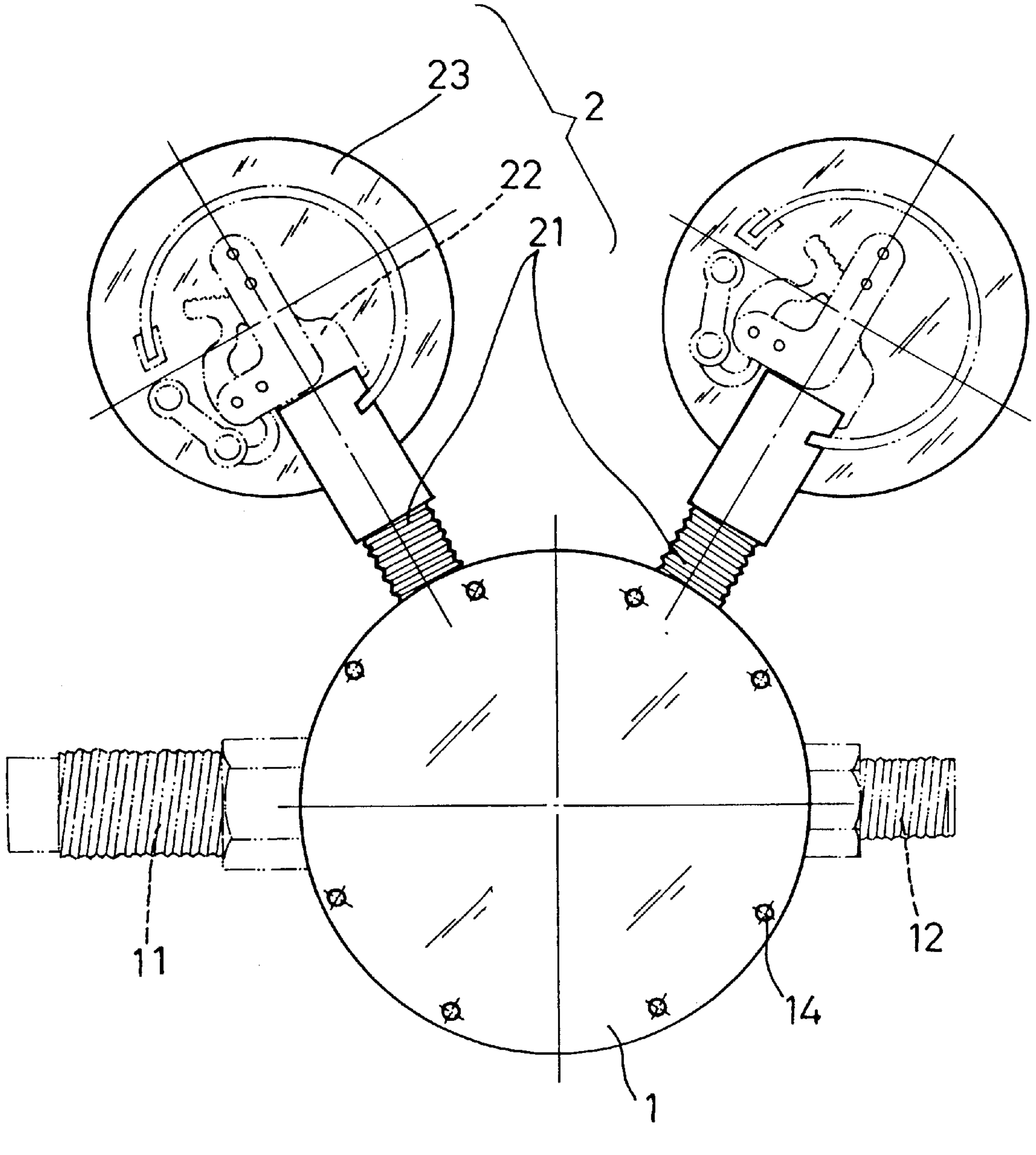
FIG. 7 is a sectional view taken along line 7—7 of FIG. 6, showing the shape of the base and the shape of the pressure gauges.
Figure 8:
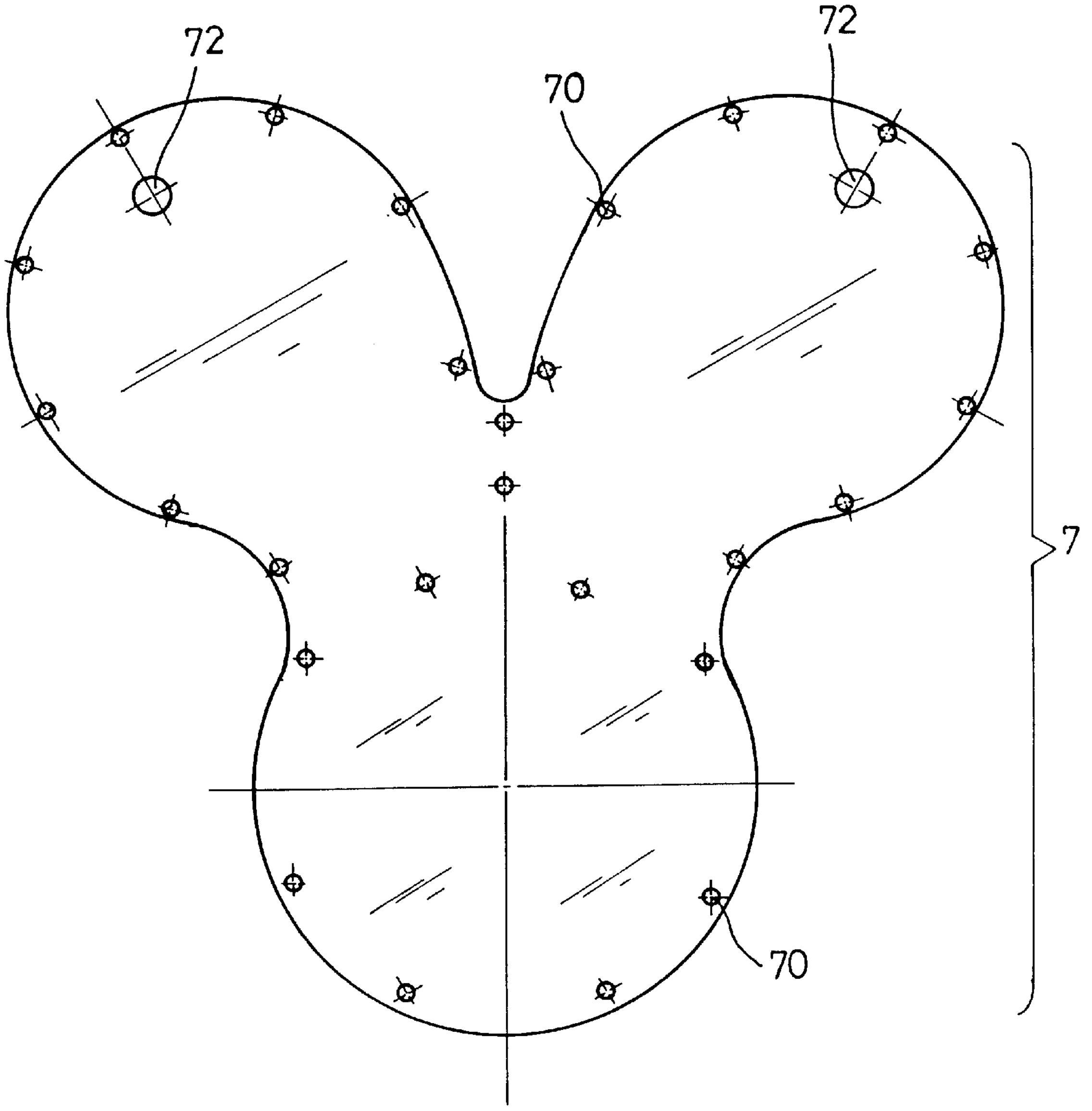
FIG. 8 is a sectional view taken along line 8—8 of FIG. 6, showing the shape and structure of the back cover plate.
Figure 9:
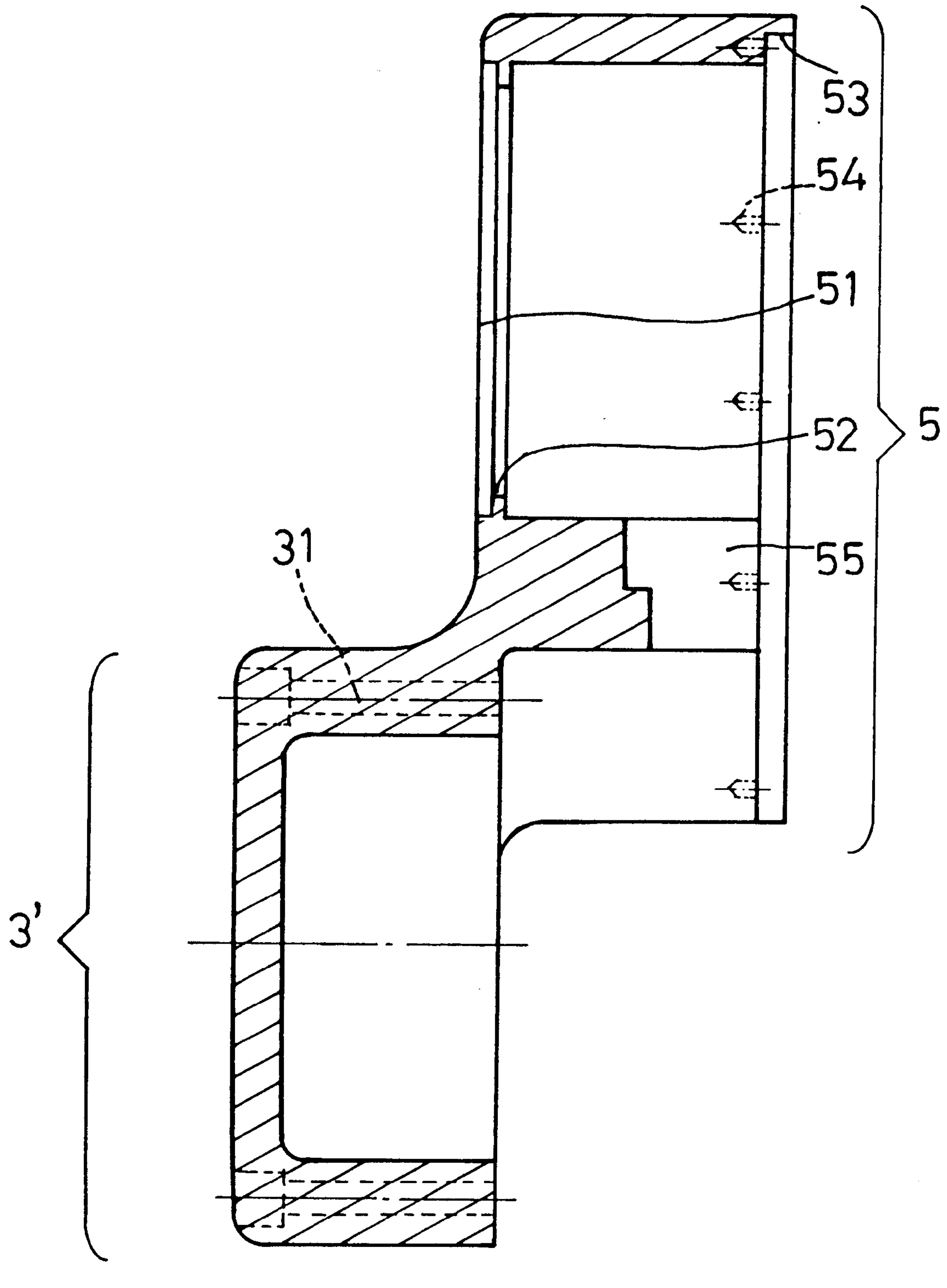
FIG. 9 illustrates the structure of the top cover according to a second embodiment of the present invention.
Figure 10:
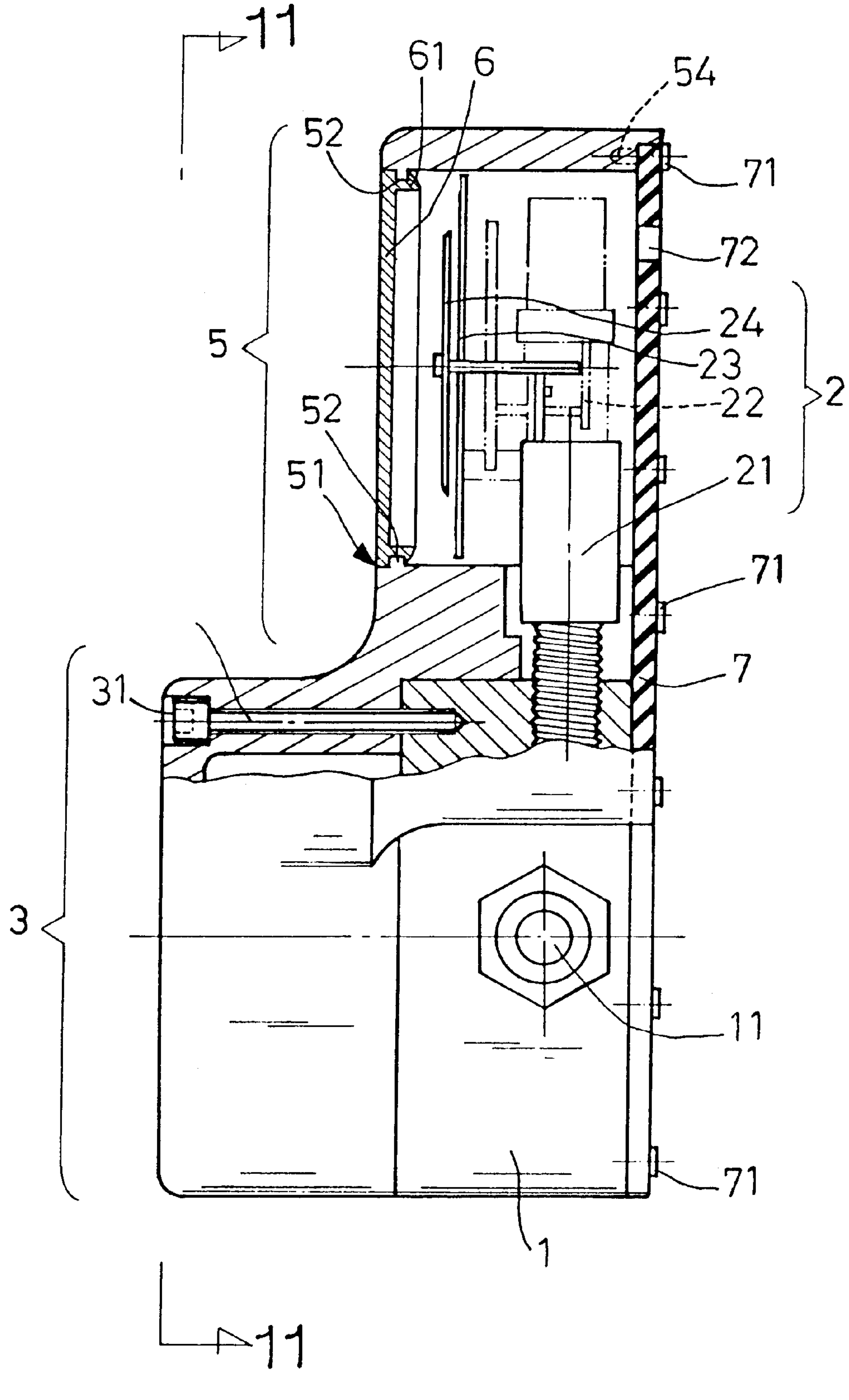
FIG. 10 is a sectional assembly view of the pressure gauge protection arrangement according to the second embodiment of the present invention.
Figure 11:
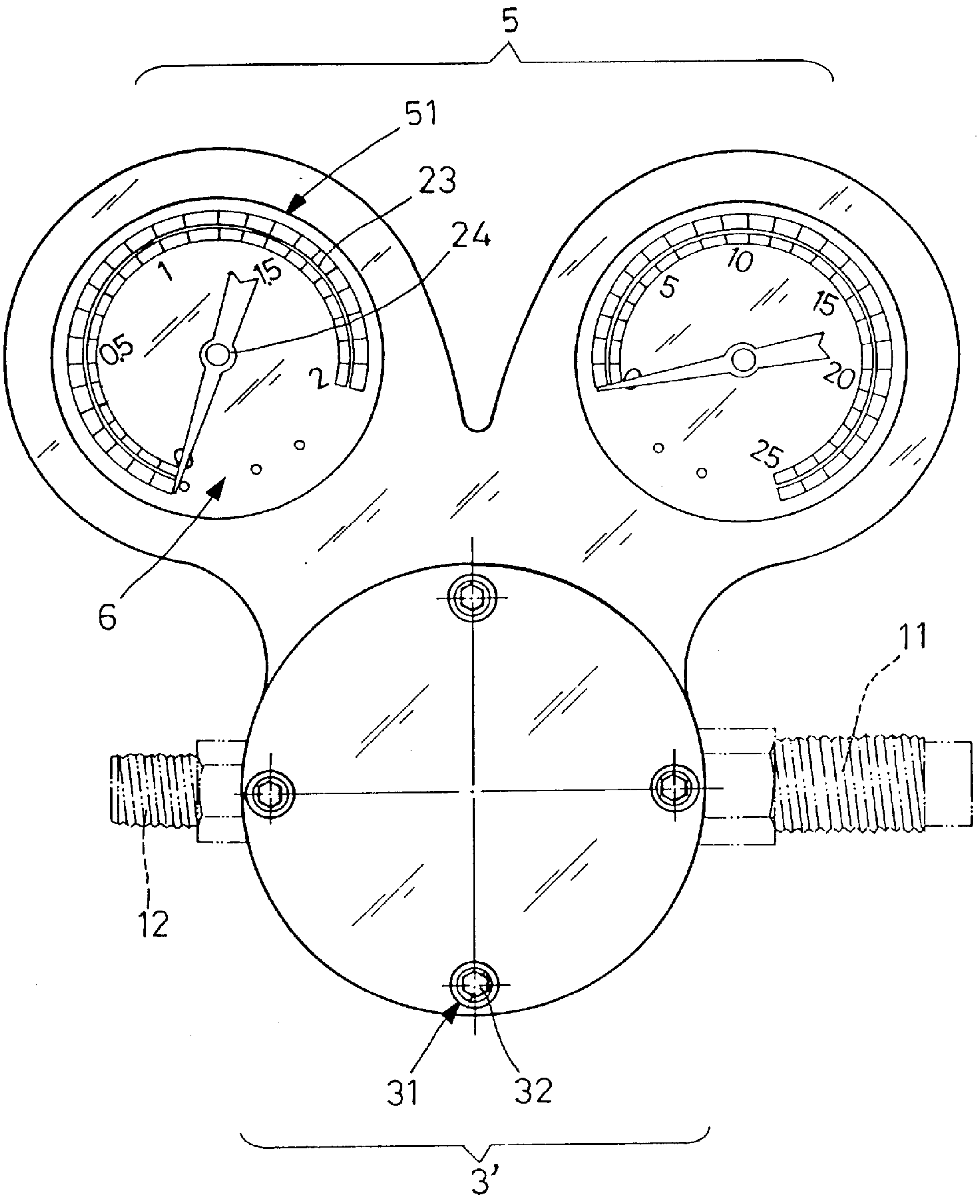
FIG. 11 is a sectional view taken along line 11—11 of FIG. 10.
Figure 12:
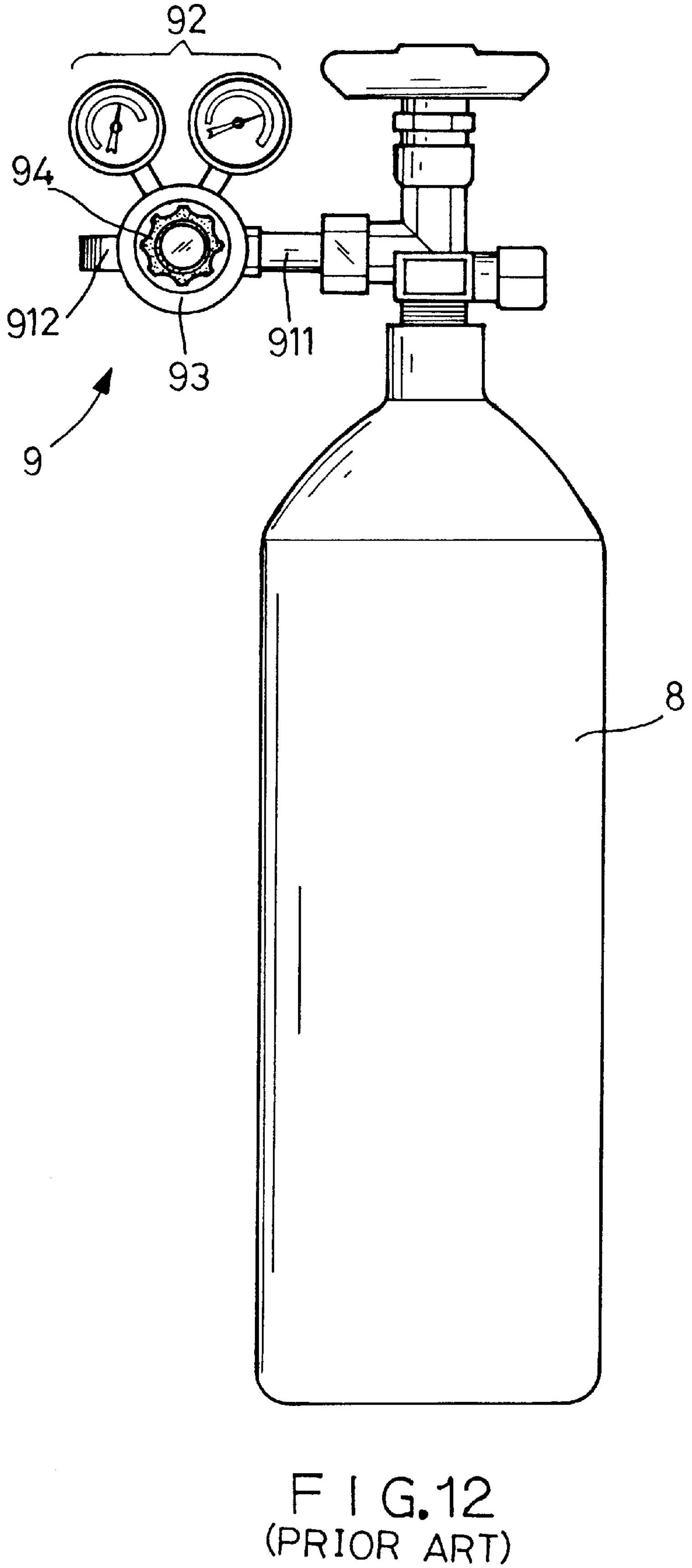
F I G.12 (PRIOR ART)
FIG. 12 illustrates the operation of a pressure regulator according to the prior art.
Figure 13:
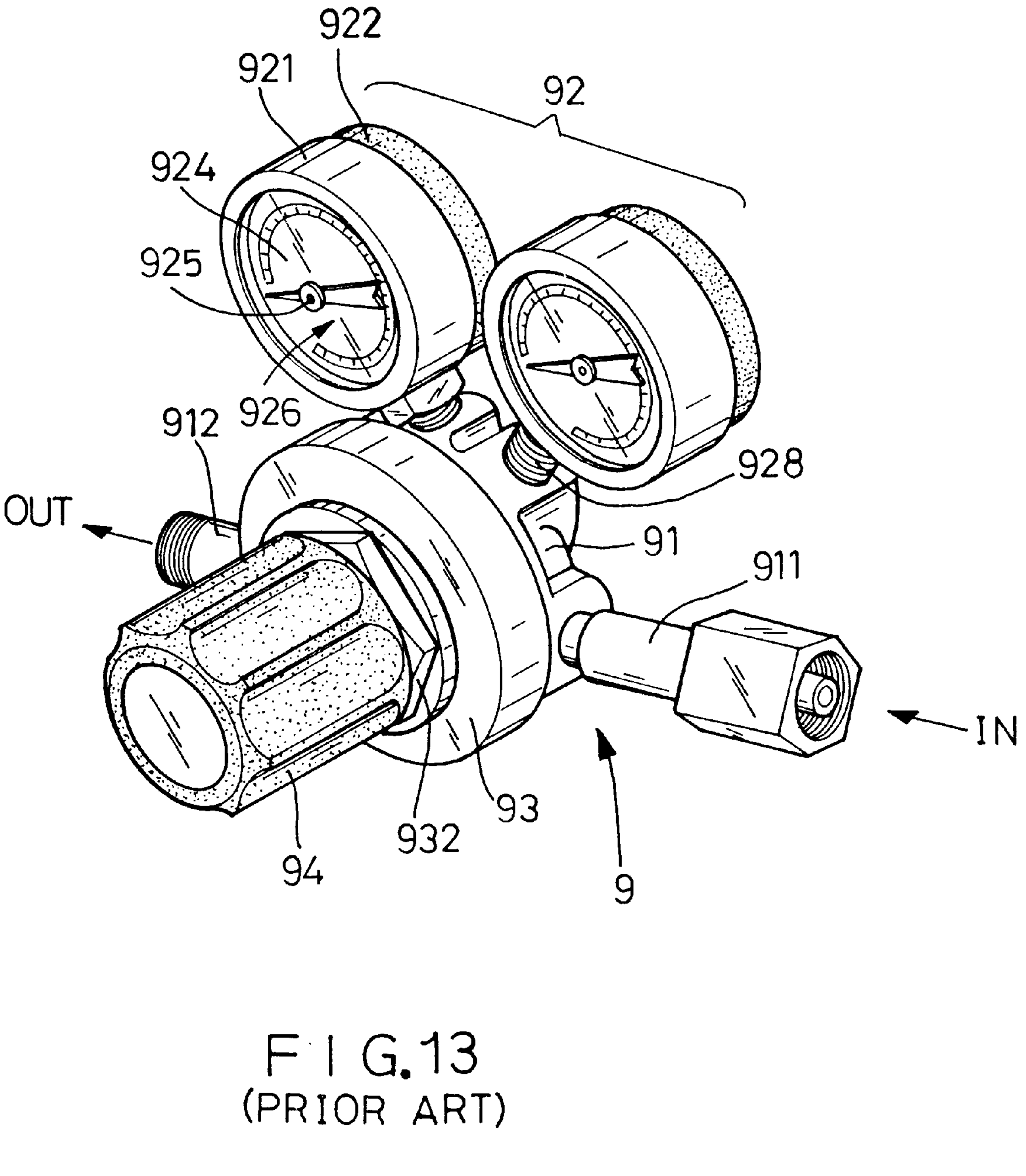
F I G.13 (PRIOR ART)
FIG. 13 illustrates the external appearance of the prior art pressure regular.
Figure 14:
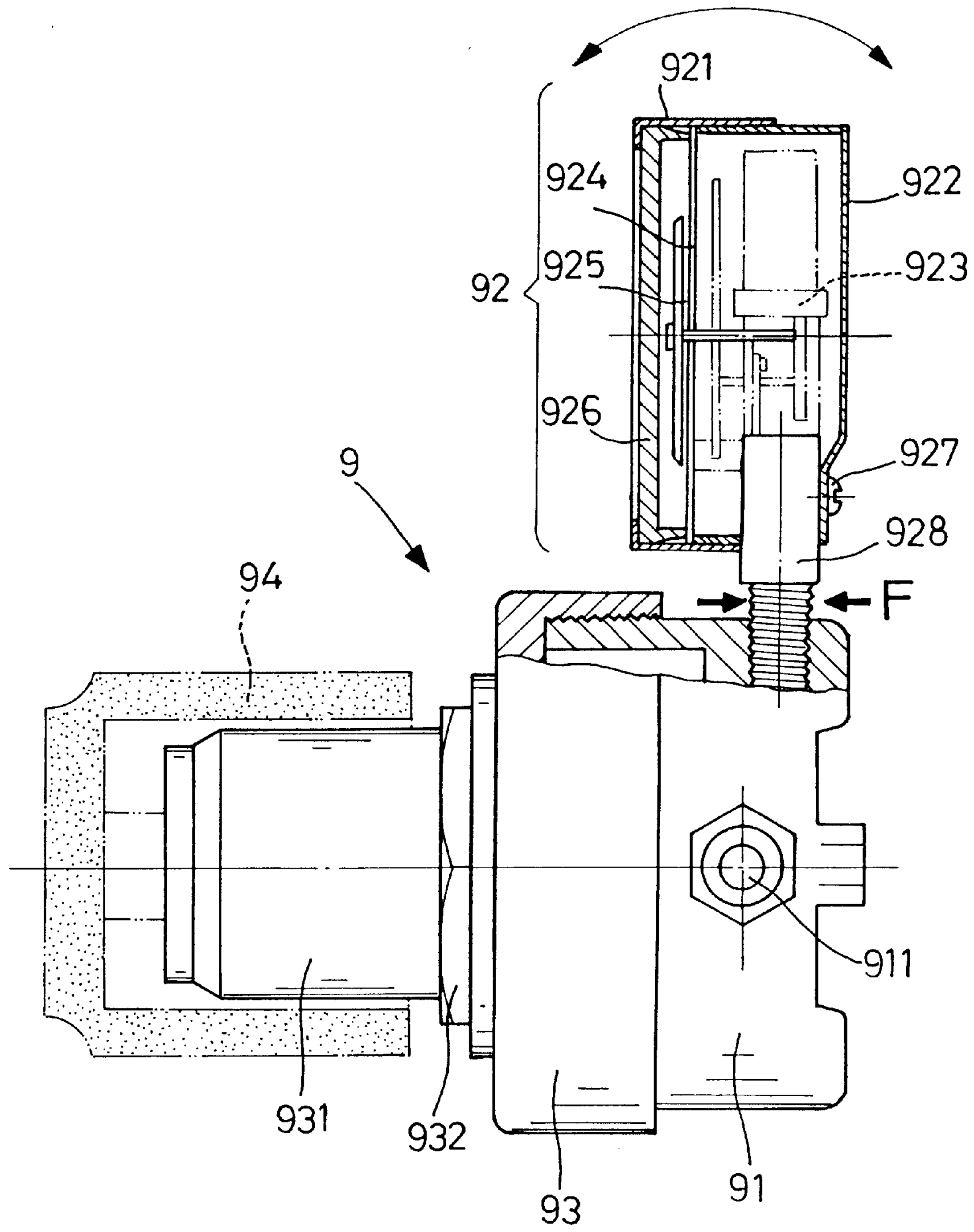
FIG. 14 (PRIOR ART)
FIG. 14 illustrates the external structure of the prior art pressure regulator.
Figure 15:
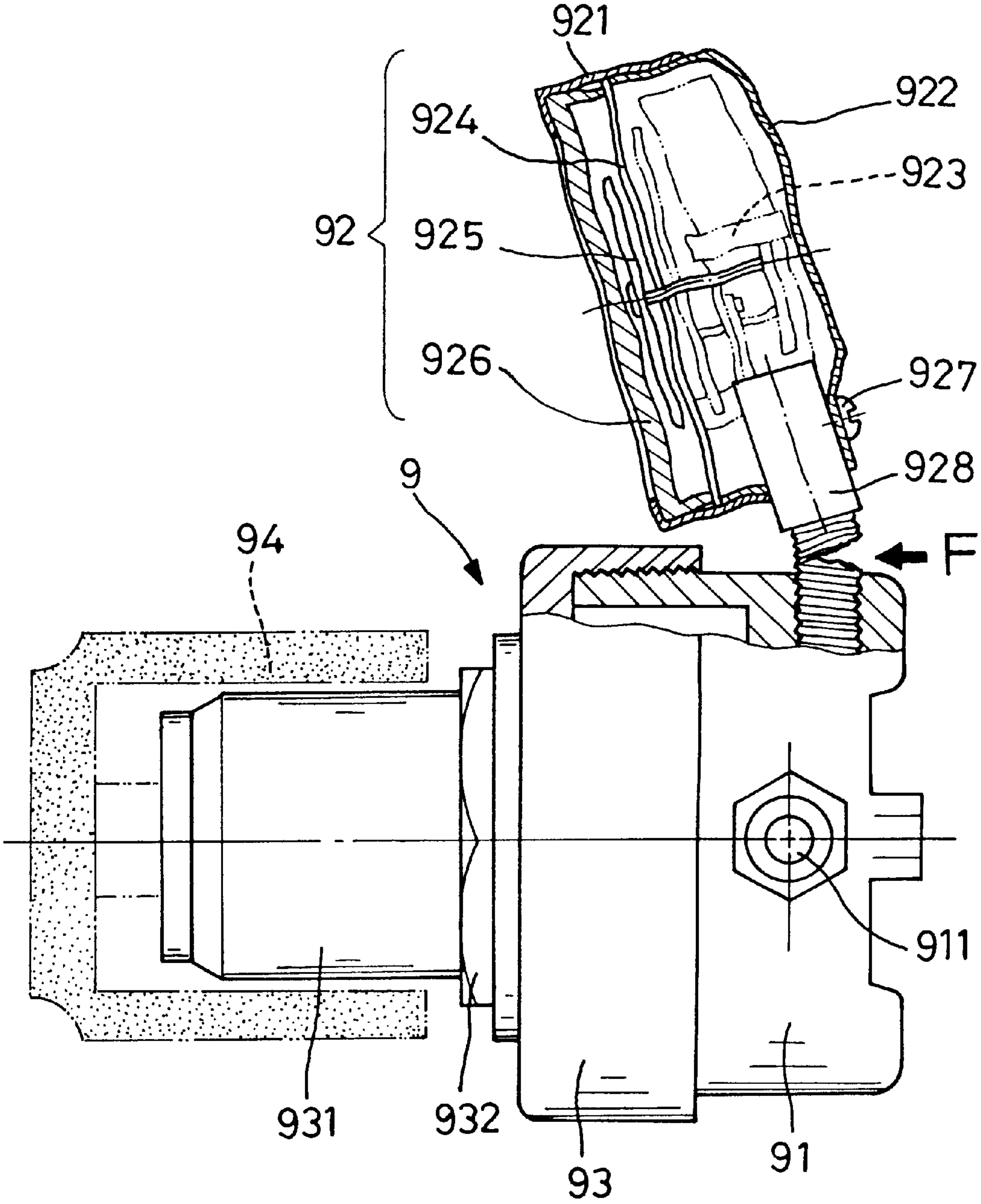
F I G. 15 (PRIOR ART)
FIG. 15 is a schematic drawing showing the prior art pressure regulator impacted and deformed.

Referring to FIGS. 7 and 8, back cover plate 7 has a plurality of mounting holes 70 provided at its lower part, and respectively fastened to the mounting holes 14 at the base 1 by fastening elements for example screws. The upper part of the back cover plate 7 fits the back side of the shield 5 for covering over the back sides of the pressure gauges 2. The lower part of the back cover plate 7 fits the back side of the base 1. Further, air vents 72 are provided at the back cover plate 7 for ventilation. When installed, the back cover plate 7 is disposed in flush with the periphery of the shield 5 and the base 1, and protects the back sides of the pressure gauges 2 against impact.

Referring to FIGS. from 1 through 6 again, the top cover 3 further comprises a stepped, tubular projection 33 at one side, and a rotary knob 4 mounted on the projection 33 and rotated to release pressure.

FIGS. from 9 through 11 show a second embodiment of the present invention. According to this alternate form, the top cover 3' (which eliminates the aforesaid projection 33) and the shield 5 are made in integrity, the glass plates 6 are mounted on the shield 5, and the back cover plate 7 is covered on the shield 5 and the top cover 3' at the back side. The top cover 3' is fixedly fastened to the base 1 by screw bolts 32. Because the top cover 3' has a smooth outside wall, trademark plate or sticker can be adhered to the outside wall of the top cover 3' to conceal the screw bolts 32 and the mounting holes 31.

It is to be understood that the drawings are designed for purposes of illustration only, and are not intended as a definition of the limits and scope of the invention disclosed.

What the invention claimed is:

1. A pressure gauge protection arrangement installed in the body of an air cylinder, comprising:

a base having an inlet pipe and an outlet pipe;

at least one pressure gauge respectively connected to said base by a respective coupling tube for air pressure detection; and a top cover fixedly mounted on said base at a front side;

wherein said base comprises a plurality of mounting holes; said top cover comprises a plurality of mounting holes respectively fastened to the mounting holes at said base by respective screw bolts, and a part integrated with a rigid shield covered on said at least one pressure gauge to protect said at least one pressure gauge against impact, said shield comprising at least one front opening respectively disposed corresponding to said at least one pressure gauge at a front side, a transparent cover plate respectively mounted in said at least one opening, and a back side covered with a back cover plate to protect back side of said at least one pressure gauge against impact.

* * * * *